3,121,071
POLYMERS OF 2-SULFO-1-SULFOMETHYL ETHYL METHACRYLATE

David P. Sheetz and Stanley J. Strycker, Midland, Mich., assignors to The Dow Chemical Company, Midland, Mich., a corporation of Delaware
No Drawing. Filed Sept. 25, 1959, Ser. No. 842,217
6 Claims. (Cl. 260—79.3)

This invention relates to the sulfo esters of methylenecarboxylic acids, and is more particularly concerned with 2-sulfo-1-sulfomethyl ethyl methacrylate, its salts, the polymer of 2-sulfo-1-sulfomethyl ethyl methacrylate, the polymers of its salts and the processes for preparing the foregoing compounds, which are useful as thickening agents and protective colloids.

2-sulfo-1-sulfomethyl ethyl methacrylate has the formula

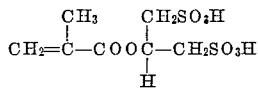

It may be prepared by contacting methacrylic acid with 2-hydroxy-1,3-propane-disulfonic acid preferably in the presence of a polymerization inhibitor, at temperatures of about −20° C. to about 100° C. for a contact time ranging from nearly instantaneous to about four hours, depending upon the reaction temperature. The reaction rapidly forms 2-sulfo-1-sulfomethyl ethyl methacrylate with water as the by-product. It has been found desirable to remove the water as it is formed during the reaction process to assure complete reaction, since the presence of water causes the reaction to reach equilibrium prematurely. Water may conveniently be removed from the reaction vessel by using low boiling azeotropic mixtures which are unreactive with either the reactants or the reaction product.

In order to prevent premature homopolymerization of methacrylic acid, it is desirable to provide a standard polymerization inhibitor for acrylic monomers such as p-methoxyphenol, phenothiazine, hydroquinone, or other known similarly acting compounds. The quantity of inhibitor desirable in the reaction will vary with the amount of reactants utilized, the conditions of the reaction, and inherent tendency of the reactants to undergo polymerization. Usually an exceedingly small amount is satisfactory, commonly 0.1 to 1.5 percent of the methacrylic acid. While temperatures from about −20° C. to about +100° C. are desirable, the reaction rate is responsive to temperature and the useful temperature range for the reaction may be lower or higher than just indicated but does not extend to a temperature at which the reactants undergo decomposition. Atmospheric pressures are operable and desirable; however, subatmospheric and superatmospheric pressures may be utilized if desired. Thus, subatmospheric pressures assist in prompt removal of water as formed.

The salts of 2-sulfo-1-sulfomethyl ethyl methacrylate may be prepared by neutralizing 2-sulfo-1-sulfomethyl ethyl methacrylate with any basic alkali metal compound or alkaline earth metal compound. Such basic alkali or alkaline earth compounds include the oxides, hydroxides, and carbonates of sodium, potassium, ammonium, lithium, cesium, rubidium, barium, calcium, magnesium, strontium, and all other such basic compounds capable of neutralizing an acidic solution. Neutralization readily takes place by reacting the basic alkali or alkaline earth metal compound with 2-sulfo-1-sulfomethyl ethyl methacrylate at room temperatures. The desirable temperature to be utilized should fall below that temperature at which hydrolysis of 2-sulfo-1-sulfomethyl ethyl methacrylate takes place. The temperatures at which hydrolysis takes place usually exceed about 20° C. Due to this finding, it is deemed preferable to carry out the neutralization step by reacting the basic alkali or alkaline earth compound with 2-sulfo-1-sulfomethyl ethyl methacrylate at a temperature below 20° C. and above that temperature at which the reactants freeze. Atmospheric pressures produce satisfactory results; therefore, subatmospheric or superatmospheric pressures are not needed or desired unless other reaction conditions dictate. 2-sulfo-1-sulfomethyl ethyl methacrylate may be readily neutralized prior to separation from the reaction mixture, and this is envisioned as being the preferred mode of operation, since a separation step is obviated by this procedure.

Polymerization of either 2-sulfo-1-sulfomethyl ethyl methacrylate or its salts may be readily accomplished by utilization of standard polymerizing procedures in an aqueous medium and inert atmosphere. An acceptable process for polymerizing consists of purging the monomeric ester or its salts with nitrogen at room temperatures and pressures. Preferably, small amounts of a free radical forming compound are utilized to accelerate the polymerization rate. However, polymerization will take place at room temperatures and pressures after long standing without added inducement.

Small amounts of the formed polymers, when added to an aqueous emulsion or synthetic polymer latex, provide a readily ascertainable thickening action.

The following examples are given to illustrate the process for preparing compounds of the present invention, but are not to be construed as limiting the invention thereto.

Example 1

A flask, equipped with a stirrer and having a vapor outlet, was charged with a mixture of 155 grams (0.5 mole) of 71 percent 2-hydroxy-1,3-propanedisulfonic acid and 258 grams (3.0 moles) of anhydrous methacrylic acid. A small amount, 1.0 gram of p-methoxyphenol, was added as an inhibitor. This solution was heated with agitation, to 90° C. for a period of about fifteen minutes. 200 milliliters of toluene was added to create an azeotropic mixture with the water being formed during the reaction process. As the reaction proceeded, water and toluene were removed azeotropically by distillation. Completion of the reaction was noted by the diminution and eventual absence of water in the fresh distillate. The completed reaction mixture, containing 2-sulfo-1-sulfomethyl ethyl methacrylate and toluene, was neutralized by the addition of 64.4 grams (0.5 mole) of 82.4 percent sodium carbonate. The evolution of carbon dioxide was vigorous. Following the addition of sodium carbonate, the aqueous liquid phase was separated from the organic liquid phase. The disodium salt was precipitated from the aqueous phase by the addition of ethanol, separated, dried in a vacuum oven, and readily identifiable with its white crystalline structure. Total yield was 159 grams (79.2 percent theory).

Example 2

A 33 percent solution of the disodium salt of 2-sulfo-1-sulfomethyl ethyl methacrylate was prepared by dissolving 33 grams of 2-sulfo-1-sulfomethyl ethyl methacrylate in 67 milliliters of water. This solution was purged with nitrogen in the presence of 0.03 gram ammonium persulfate for about two hours at room temperature and atmospheric pressure. The solution became considerably more viscous which signified polymerization. The solution of the polymer of the disodium salt of 2-sulfo-1-sulfomethyl ethyl methacrylate was a clear, syrupy liquid.

The polymers of both 2-sulfo-1-sulfomethyl ethyl methacrylate and the water-soluble salts of 2-sulfo-1-sulfomethyl ethyl methacrylate, when added to aqueous emulsions such as a natural or synthetic polymer latex, are capable of thickening the aqueous phase and of increasing the viscosity with a high measure of effectiveness. As illustrative, 1½ grams of a 33 percent aqueous solution of the polymer of the disodium salt of 2-sulfo-1-sulfomethyl ethyl methacrylate were added to 200 grams of an aqueous styrene-butadiene latex or polymer emulsion containing 48 percent solids and having a viscosity of 27 centipoises as measured by a Brookfield viscosimeter. Immediately, the viscosity was increased to 80 centipoises, as measured by the Brookfield viscosimeter, without degradation of the latex dispersion.

Various modifications may be made in the present invention without departing from the spirit or scope thereof, and it is to be understood that we limit ourselves only as defined in the appended claims.

We claim:
1. 2-sulfo-1-sulfomethyl ethyl methacrylate.
2. A salt of 2-sulfo-1-sulfomethyl ethyl methacrylate.
3. The disodium salt of 2-sulfo-1-sulfomethyl ethyl methacrylate.
4. The polymer of 2-sulfo-1-sulfomethyl ethyl methacrylate.
5. The polymer of a water-soluble salt of 2-sulfo-1-sulfomethyl ethyl methacrylate.
6. The polymer of the disodium salt of 2-sulfo-1-sulfomethyl ethyl methacrylate.

References Cited in the file of this patent

UNITED STATES PATENTS

| | | |
|---|---|---|
| 2,169,998 | Gunther | Aug. 22, 1939 |
| 2,185,455 | Cahn | Jan. 2, 1940 |
| 2,812,267 | Garner et al. | Nov. 5, 1957 |
| 2,923,734 | Sheetz | Feb. 2, 1960 |

FOREIGN PATENTS

| | | |
|---|---|---|
| 566,000 | Belgium | Sept. 24, 1958 |